US012568079B2

(12) United States Patent
Shrestha

(10) Patent No.: US 12,568,079 B2
(45) Date of Patent: *Mar. 3, 2026

(54) AUTHORIZING FRONT-END DEVICES WITH TOKENS

(71) Applicant: Capital One Services, LLC, McLean, VA (US)

(72) Inventor: Tejen Shrestha, Denver, CO (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,869

(22) Filed: Apr. 23, 2024

(65) Prior Publication Data

US 2024/0323183 A1 Sep. 26, 2024

Related U.S. Application Data

(63) Continuation of application No. 18/188,983, filed on Mar. 23, 2023, now Pat. No. 12,010,113.

(51) Int. Cl.
*H04L 9/40* (2022.01)

(52) U.S. Cl.
CPC ........ *H04L 63/0853* (2013.01); *H04L 63/102* (2013.01)

(58) Field of Classification Search
CPC ............................ H04L 63/0853; H04L 63/102
USPC .......................................................... 726/4
See application file for complete search history.

(56) References Cited

U.S. PATENT DOCUMENTS 11,510,092 B1 * 11/2022 Dawson ................. H04W 48/18
11,899,670 B1 * 2/2024 Bhagat ................ G06F 16/2452

2019/0007212 A1 * 1/2019 Neve de Mevergnies ..................
H04L 9/3226
2019/0372958 A1 12/2019 Dunjic et al.
2020/0125700 A1 * 4/2020 Chang ................. G06F 21/6218
2020/0244066 A1 * 7/2020 Kerhoas .................... H02H 9/04
2021/0027279 A1 1/2021 Hammad
2021/0042743 A1 * 2/2021 Green .................... G07F 19/206
2022/0224535 A1 7/2022 Coffing (Continued)

FOREIGN PATENT DOCUMENTS

WO 2020076854 A2 4/2020

OTHER PUBLICATIONS

International Search Report and Written Opinion for International Application No. PCT/US2024/012340, mailed on Apr. 9, 2024, 10 Pages.

(Continued)

*Primary Examiner* — Anthony D Brown

(74) *Attorney, Agent, or Firm* — Harrity & Harrity, LLP

(57) ABSTRACT

In some implementations, a token client may transmit, to a token server, a request for a token associated with the front-end device and derived from a secret associated with the front-end device. The token client may receive, from the token server, the token in response to the request for the token and may transmit, to the front-end device, the token. The token client may determine an expiry associated with the token. The token client may transmit, to the token server, a request for a new token prior to the expiry associated with the token. The token client may receive, from the token server, the new token in response to the request for the new token and may transmit, to the front-end device, the new token.

20 Claims, 9 Drawing Sheets

(56)         References Cited

U.S. PATENT DOCUMENTS

2022/0407866 A1    12/2022   Tanutama et al.

OTHER PUBLICATIONS

Adam S.I., et al., "Restful Web Service Implementation on Unklab Information System Using JSON Web Token (JWT)," 2020 2nd International Conference on Cybernetics and Intelligent System (ICORIS), 2020, 7 pages.

Co-pending U.S. Appl. No. 18/188,983, inventor Shrestha; Tejen, filed on Mar. 23, 2023.

Ethelbert O., et al., "A JSOM Token-based Authentication and Access Management Schema for Cloud SaaS Applications," Institute of Informatics, 2017, 6 pages.

Jones M., et al., "JSON Web Token (JWT)," Internet Engineering Task Force (IETF), 2015, pp. 1-30.

Setiawan A., et al., "Implementasi JSON Web Token Berbasis Algoritma SHA-512 Untuk Otentikasi Aplikasi Batikkita," Jurnal Resti, 2020, vol. 4(6), pp. 1036-1045.

* cited by examiner

100

Token
server

120
Generate
token

115
Secret associated with
front-end device

Key distribution center

100

Token server

125
Token

Token client

130
Token

Front-end device

300

Bus
310

Processor
320

Memory
330

Input
Component
340

Output
Component
350

Communication
Component
360

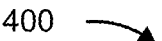

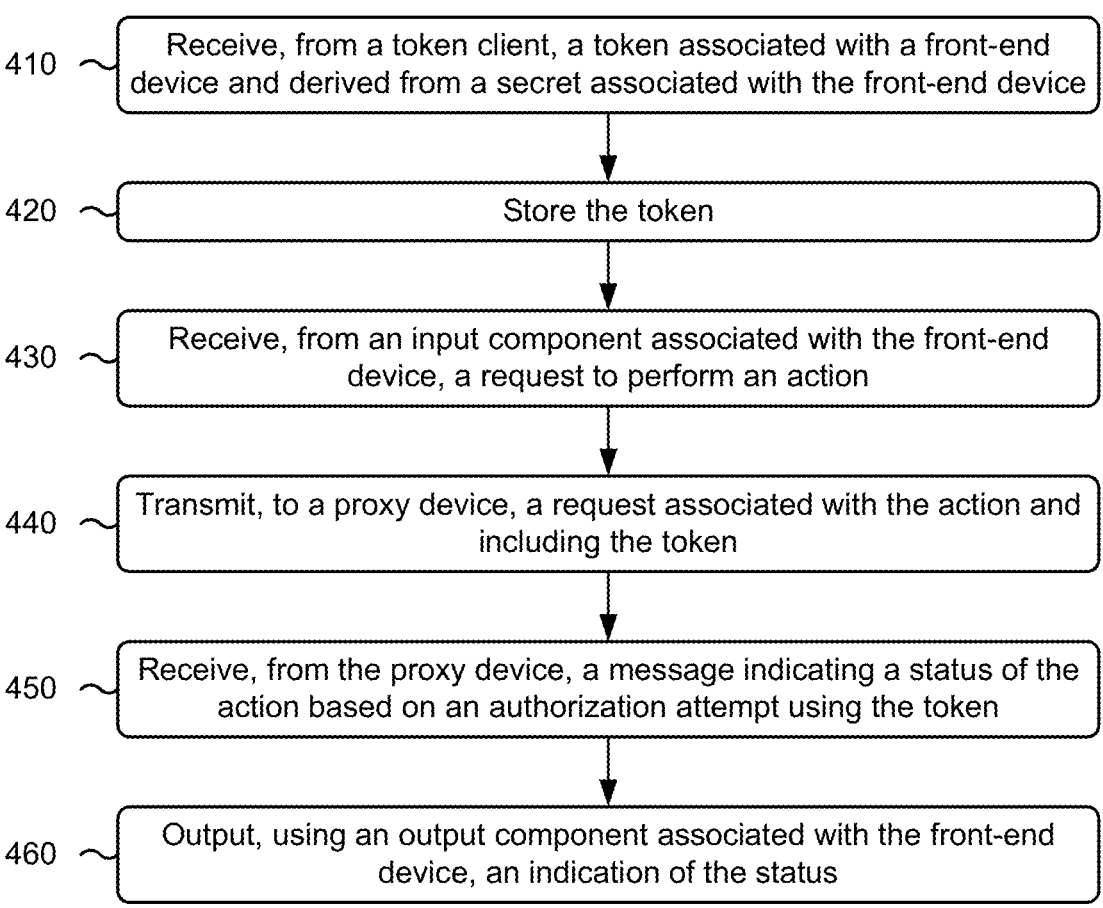

400

410 — Receive, from a token client, a token associated with a front-end device and derived from a secret associated with the front-end device 420 — Store the token 430 — Receive, from an input component associated with the front-end device, a request to perform an action 440 — Transmit, to a proxy device, a request associated with the action and including the token 450 — Receive, from the proxy device, a message indicating a status of the action based on an authorization attempt using the token 460 — Output, using an output component associated with the front-end device, an indication of the status

FIG. 4

AUTHORIZING FRONT-END DEVICES WITH TOKENS

RELATED APPLICATION

This application is a continuation of U.S. patent application Ser. No. 18/188,983, filed Mar. 23, 2023, which is incorporated herein by reference in its entirety.

BACKGROUND

Front-end devices, such as access control terminals, automated teller machines, and point-of-sale terminals, communicate with backend systems in order to perform actions (e.g., balance inquiries, withdrawals, deposits, or transactions, among other examples). Accordingly, the backend systems generally authenticate front-end devices before allowing the front-end devices to request actions to be performed.

SUMMARY

Some implementations described herein relate to a system for authorizing a front-end device. The system may include one or more memories and one or more processors communicatively coupled to the one or more memories. The one or more processors may be configured to receive, from a token client, a token associated with the front-end device and derived from a secret associated with the front-end device. The one or more processors may be configured to store the token. The one or more processors may be configured to receive, from an input component associated with the front-end device, a request to perform an action. The one or more processors may be configured to transmit, to a proxy device, a request associated with the action and including the token. The one or more processors may be configured to receive, from the proxy device, a message indicating a status of the action based on an authorization attempt using the token. The one or more processors may be configured to output, using an output component associated with the front-end device, an indication of the status.

Some implementations described herein relate to a method of authorizing a front-end device. The method may include transmitting, to a token server, a request for a token associated with the front-end device and derived from a secret associated with the front-end device. The method may include receiving, from the token server, the token in response to the request for the token. The method may include transmitting, to the front-end device, the token. The method may include determining an expiry associated with the token. The method may include transmitting, to the token server, a request for a new token prior to the expiry associated with the token. The method may include receiving, from the token server, the new token in response to the request for the new token. The method may include transmitting, to the front-end device, the new token.

Some implementations described herein relate to a non-transitory computer-readable medium that stores a set of instructions for authorizing a front-end device. The set of instructions, when executed by one or more processors of a device, may cause the device to receive, from a front-end device, a request, including a token associated with the front-end device, to perform an action. The set of instructions, when executed by one or more processors of the device, may cause the device to verify the token. The set of instructions, when executed by one or more processors of the device, may cause the device to transmit, to an application programming interface (API) gateway, a request associated with the action based on the token being verified. The set of instructions, when executed by one or more processors of the device, may cause the device to receive, from the API gateway, an indication of a status of the action in response to the request associated with the action. The set of instructions, when executed by one or more processors of the device, may cause the device to transmit, to the front-end device, a message indicating the status.

BRIEF DESCRIPTION OF THE DRAWINGS

FIG. 4 is a flowchart of an example process relating to authorizing front-end devices with tokens, in accordance with some embodiments of the present disclosure.

DETAILED DESCRIPTION

Figure 1A:
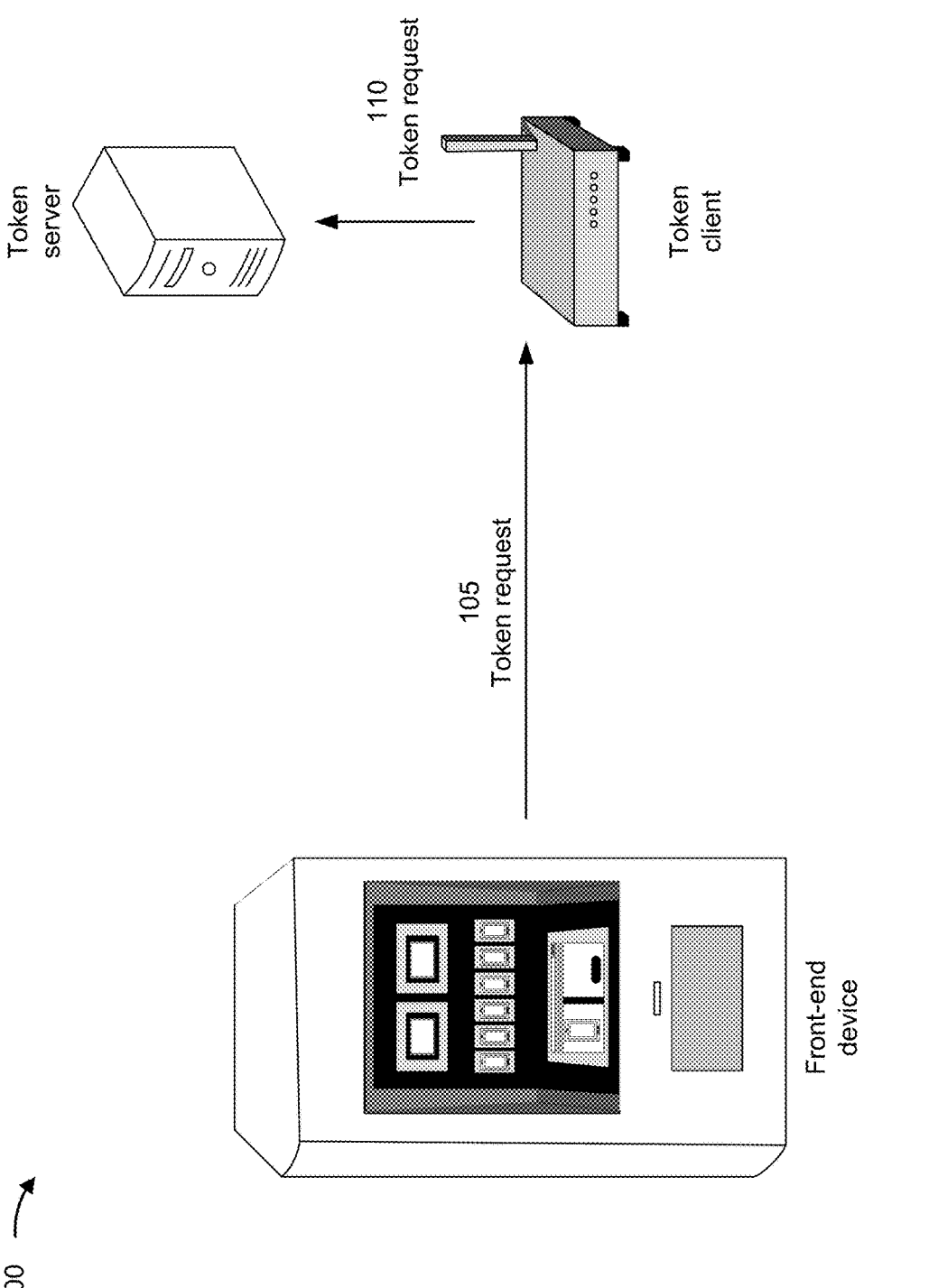
FIGS. 1A-1F are diagrams of an example implementation relating to authorizing front-end devices with tokens, in accordance with some embodiments of the present disclosure.

The following detailed description of example implementations refers to the accompanying drawings. The same reference numbers in different drawings may identify the same or similar elements.

Front-end devices, such as access control terminals, automated teller machines (ATMs), or point-of-sale (POS) terminals, generally communicate with backend systems (e.g., remote servers, whether physical servers or machines implemented in a cloud environment) in order to perform actions. For example, a backend system may authenticate an access control terminal before accepting a request from the access control terminal (e.g., a request to verify an identity of a user requesting permission to an access-controlled entry). In another example, a backend system may authenticate an ATM before accepting a request from the ATM (e.g., a request to perform a balance inquiry on, or a withdrawal from, an account associated with a user of the ATM). In yet another example, a backend system may authenticate a PoS terminal before accepting a request from the POS terminal (e.g., a request to perform a transaction using an account associated with a user of the POS terminal).

One authentication technique for front-end devices is certificate-based. For example, a certificate manager may deliver a digital certificate to a front-end device such that the front-end device may digitally sign messages that are sent to a backend system. A digital certificate generally includes a public key (e.g., used to generate digital signatures) as well as information about the public key and a signature verifying authenticity of the public key. The backend system may thus verify the messages based on the digital certificate. However, transmitting the certificates incurs network overhead. Additionally, digitally signing messages using the certificates incurs significant power and processing costs at the front-end device.

Moreover, if a certificate is compromised (e.g., obtained by a bad actor), the certificate manager would generate a new digital certificate, which incurs significant power and processing costs at the certificate manager. Furthermore, the certificate manager would deliver the new digital certificate to the front-end device, which again incurs network overhead.

Some implementations described herein enable token-based authorization of a front-end device. For example, a token client may receive a token from a token server and forward the token to the front-end device. A token is generally a data structure (e.g., that can be included in a message) including a signature derived from a certificate (or another type of cryptographic key). Accordingly, the front-end device may include the token in any messages to a backend system. As a result, the front-end device conserves power and processing costs that would otherwise have been incurred in digitally signing the messages with a certificate. Additionally, the token client uses less network overhead to transmit the token as compared with a certificate.

Moreover, security is improved because the backend system may use a proxy device to prevent the front-end device from accessing application programming interfaces (APIs) of the backend system directly. Security is also improved because the token client may periodically rotate the token for the front-end device with little power, processing, and network costs. As a result, even if a token is compromised (e.g., obtained by a bad actor), the token client will replace the token shortly, which conserves power and processing costs that would otherwise have been incurred in generating a new certificate for the front-end device.

FIGS. 1A-1F are diagrams of an example 100 associated with authorizing front-end devices with tokens. As shown in FIGS. 1A-1F, example 100 includes a front-end device, a token client, a token server, a key distribution center (KDC), a proxy device, and an API gateway. These devices are described in more detail in connection with FIGS. 2 and 3.

As shown in FIG. 1A and by reference number 105, the front-end device may transmit, and the token client may receive, a request for a token. For example, the front-end device may transmit a request for authorization of the front-end device, and the request for authorization may be associated with token-based authorization. In some implementations, the front-end device may transmit the request periodically (e.g., according to a schedule, whether a default schedule or a schedule configured by an administrator of the front-end device). Alternatively, the front-end device may transmit the request in response to a trigger (e.g., a booting of an operating system (OS) of the front-end device or another type of start-up procedure) or in response to input from an administrator (e.g., input that triggers the request and that is received using an input component associated with the front-end device, such as a keyboard, a mouse, or a touchscreen, among other examples).

The front-end device may address the request to an Internet protocol (IP) address, a medium access control (MAC) address, and/or another type of identifier associated with the token client. In some implementations, the request may include a hypertext transfer protocol (HTTP) request, a file transfer protocol (FTP) request, or another type of web request. Additionally, or alternatively, the front-end device may perform a call to an API associated with the token client such that the call to the API comprises the request. The front-end device may include an identifier of the front-end device (e.g., a machine name, a serial number, an IP address, a MAC address, or another type of identifier associated with the front-end device) in the request (e.g., in a header of the web request and/or as an argument in the call to the API).

As shown by reference number 110, the token client may transmit, and the token server may receive, a request for a token that is associated with the front-end device and that is derived from a secret associated with the front-end device. The token client may transmit the request for the token based on the request for authorization from the front-end device. For example, the token client may forward the request from the front-end device to the token server. Alternatively, the token client may extract information from the request from the front-end device and generate a request to transmit to the token server that includes the extracted information.

The token client may address the request to an IP address, a MAC address, and/or another type of identifier associated with the token server. In some implementations, the request may include an HTTP request, an FTP request, or another type of web request. Additionally, or alternatively, the token client may perform a call to an API associated with the token server such that the call to the API comprises the request. The token client may include an identifier of the front-end device (e.g., a machine name, a serial number, an IP address, a MAC address, or another type of identifier associated with the front-end device) in the request (e.g., in a header of the web request and/or as an argument in the call to the API). Because the token client is (at least virtually) between the token server and the front-end device, security is improved because the front-end device cannot directly access the token server (or any APIs managed by the token server). For example, the token client may use a secure communication channel with the token server to transmit the request and receive the token, while other devices without a secure communication channel with the token server cannot transmit to, or receive from, the token server. Therefore, the token server is protected from attacks, such as a denial-of-service (DOS) attack or a man-in-the-middle attack, among other examples.

Figure 1B:
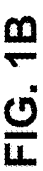

As shown in FIG. 1B and by reference number 115, the KDC may transmit, and the token server may receive, the secret associated with the front-end device. The secret may be a certificate or another type of data structure that is uniquely (or at least quasi-uniquely, relative to the KDC) associated with the front-end device. In some implementations, the token server may transmit a request for the secret based on the request from the token client. Accordingly, the KDC may transmit, and the token server may receive, the secret in response to the request for the secret.

The token server may address the request for the secret to an IP address, a MAC address, and/or another type of identifier associated with the KDC. In some implementations, the request for the secret may include an HTTP request, an FTP request, or another type of web request. Additionally, or alternatively, the token server may perform a call to an API associated with the KDC such that the call to the API comprises the request for the secret. The token server may include an identifier of the front-end device (e.g., a machine name, a serial number, an IP address, a MAC address, or another type of identifier associated with the front-end device) in the request for the secret (e.g., in a header of the web request and/or as an argument in the call to the API). Because the token server is (at least virtually) between the token client and the KDC, security is improved because the token client cannot directly access the KDC (or any APIs managed by the KDC). For example, the token server may use a secure communication channel with the KDC to transmit the request and receive the secret, while other devices without a secure communication channel with the KDC cannot transmit to, or receive from, the KDC. Therefore, the KDC is protected from attacks, such as a DOS attack or a man-in-the-middle attack, among other examples.

As shown by reference number 120, the token server may generate the token based on the secret. The token server may generate the token in response to the request from the token client, as described in connection with reference number 110. The token may be a JavaScript object notation (JSON) web token (JWT) or another type of web token. For example, the token may include a header, a payload including a set of claims (e.g., an issued at time claim in an iat field and/or a custom claim in a custom field, among other examples), and a signature derived from the secret using a cryptographic algorithm.

The token may be associated with an expiry time (e.g., an expiration time claim in an exp field). The expiry time may be a relative time after an issued time (e.g., the token expires 12 hours after creation or 1 day after creation, among other examples). Alternatively, the expiry time may be an absolute time within a time representation (e.g., Unix time, coordinated universal time (UTC), or another similar time representation). Additionally, or alternatively, the token may be associated with a use-based expiry (e.g., a use threshold). For example, the token may expire after being used by the front-end device 5 times or 50 times, among other examples.

Figure 1C:

As shown in FIG. 1C and by reference number 125, the token server may transmit, and the token client may receive, the token. The token server may transmit, and the token client may receive, the token in response to the request for the token from the token client, as described in connection with reference number 110. In some implementations, the token client may determine an expiry associated with the token. For example, the token client may decode the token (e.g., from a Base64url encoding, as defined in the network working group (NWC) request for comments (RFC) 3548 from the Internet Engineering Task Force (IETF), or another type of encoding) to determine an expiry time and/or a use-based expiry associated with the token, as described above.

As shown by reference number 130, the token client may transmit, and the front-end device may receive, the token. The token client may transmit, and the front-end device may receive, the token in response to the request for authorization from the front-end device, as described in connection with reference number 105. In some implementations, the front-end device may store the token. The front-end device may store the token in a storage associated with the front-end device. The storage may be integrated with the front-end device (e.g., a local memory, such as a registry, associated with the front-end device). Alternatively, the storage may be at least partially separate (e.g., physically, logically, and/or virtually) from the front-end device. Accordingly, the front-end device may transmit a request to store the token (along with the token) to the storage, and the storage may transmit a confirmation message to the front-end device in response to storing the token.

Figure 1D:
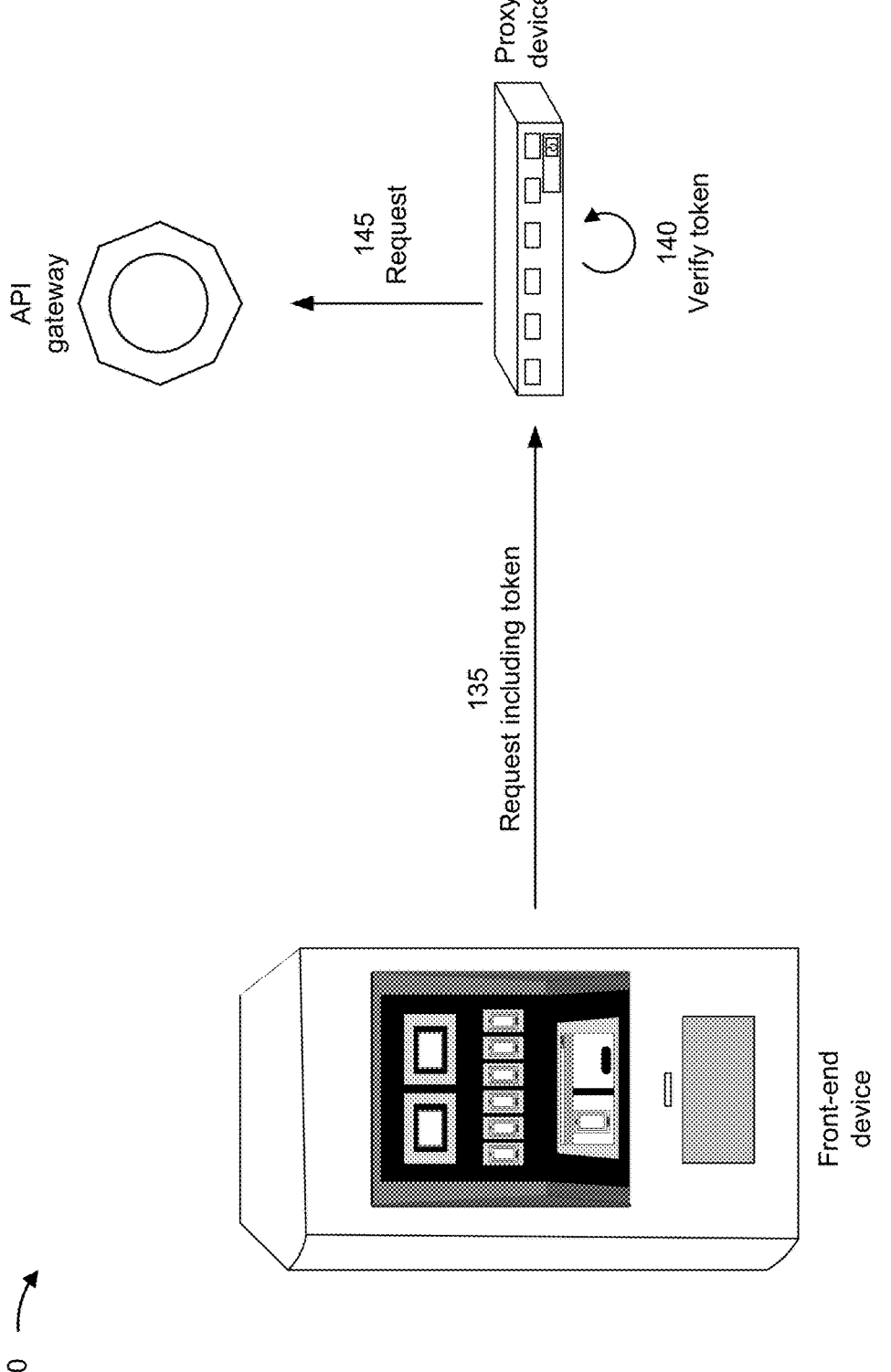

As shown in FIG. 1D and by reference number 135, the front-end device may transmit, and the proxy device may receive, a request, including the token, to perform an action. The action may include verifying an identity of a user requesting permission to an access-controlled entry, performing a balance inquiry on an account of a user, performing a withdrawal from an account of a user, performing a deposit to an account of a user, or performing a transaction using an account of a user, among other examples. For example, the front-end device may receive input from the user (e.g., using an input component associated with the front-end device, such as a keyboard, a mouse, or a touchscreen, among other examples) that triggers the request to the proxy device. Accordingly, the front-end device may generate the request based on the input. Alternatively, the front-end device may transmit the request periodically (e.g., according to a schedule, whether a default schedule or a schedule configured by the user of the front-end device). In some implementations, the front-end device may receive the token from the storage (e.g., retrieved from a local storage or received from a separate storage in response to a request for the token from the front-end device) in order to include the token in the request to the proxy device. The front-end device may include the token in a header of the request.

The front-end device may address the request to an IP address, a MAC address, and/or another type of identifier associated with the proxy device. In some implementations, the request may include an HTTP request, an FTP request, or another type of web request. Additionally, or alternatively, the front-end device may perform a call to an API associated with the proxy device such that the call to the API comprises the request. The front-end device may include an identifier of the front-end device (e.g., a machine name, a serial number, an IP address, a MAC address, or another type of identifier associated with the front-end device) in the request (e.g., in a header of the web request and/or as an argument in the call to the API).

As shown by reference number 140, the proxy device may verify the token. For example, the proxy device may extract the token from a header of the request in order to verify the extracted token. In some implementations, the proxy device may determine whether the token has expired. For example, the proxy device may determine whether an expiry time associated with the token has passed and may reject the request from the front-end device based on the expiry time (e.g., indicated in the token, as described above) having passed. Additionally, or alternatively, the proxy device may determine whether a use threshold (e.g., indicated in the token, as described above) is satisfied and may reject the request from the front-end device (e.g., by transmitting a failure message to the front-end device) based on the use threshold being satisfied. For example, the proxy device may track a quantity of requests from the front-end device (e.g., using a data structure that stores an integer representing the quantity of request in association with an identifier associated with the front-end device) and reject the request from the front-end device (e.g., by transmitting a failure message to the front-end device) based on the quantity of requests satisfying the use threshold.

Additionally, or alternatively, the proxy device may transmit the token to the token client in a request for verification. For example, the proxy device may address the request for verification to an IP address, a MAC address, and/or another type of identifier associated with the token client. In some implementations, the request for verification may include an HTTP request, an FTP request, or another type of web request. Additionally, or alternatively, the proxy device may perform a call to an API associated with the token client such that the call to the API comprises the request for verification. Alternatively, the proxy device may perform an API call, including the token as an argument, to an authentication function (e.g., an API associated with a backend system). The proxy device may include an identifier of the front-end device (e.g., a machine name, a serial number, an IP address, a MAC address, or another type of identifier associated with the front-end device) in the request for verification (e.g., in a header of the web request and/or as an argument in the call to the API). Accordingly, the proxy device may receive an indication of whether the token is valid in response to the request for verification and thus may verify the token (or determine that the token is expired or otherwise invalid) based on a response including the indication of whether the token is valid.

As shown by reference number 145, the proxy device may transmit, and the API gateway may receive, a request associated with the action. The proxy device may transmit, and the API gateway may receive, the request associated with the action based on the token being verified.

The proxy device may address the request to an IP address, a MAC address, and/or another type of identifier associated with the API gateway. In some implementations, the request may include an HTTP request, an FTP request, or another type of web request. Additionally, or alternatively, the proxy device may perform a call to an API associated with the API gateway such that the call to the API comprises the request. The proxy device may include an identifier of the front-end device (e.g., a machine name, a serial number, an IP address, a MAC address, or another type of identifier associated with the front-end device) in the request (e.g., in a header of the web request and/or as an argument in the call to the API). Because the proxy device is (at least virtually) between the API gateway and the front-end device, security is improved because the front-end device cannot directly access the API gateway (or a backend system associated with the API gateway). For example, the proxy device may use a secure communication channel with the API gateway to transmit the request, while other devices without a secure communication channel with the API gateway cannot transmit to, or receive from, the API gateway. Therefore, the API gateway is protected from attacks, such as a DOS attack or a man-in-the-middle attack, among other examples.

Figure 1E:
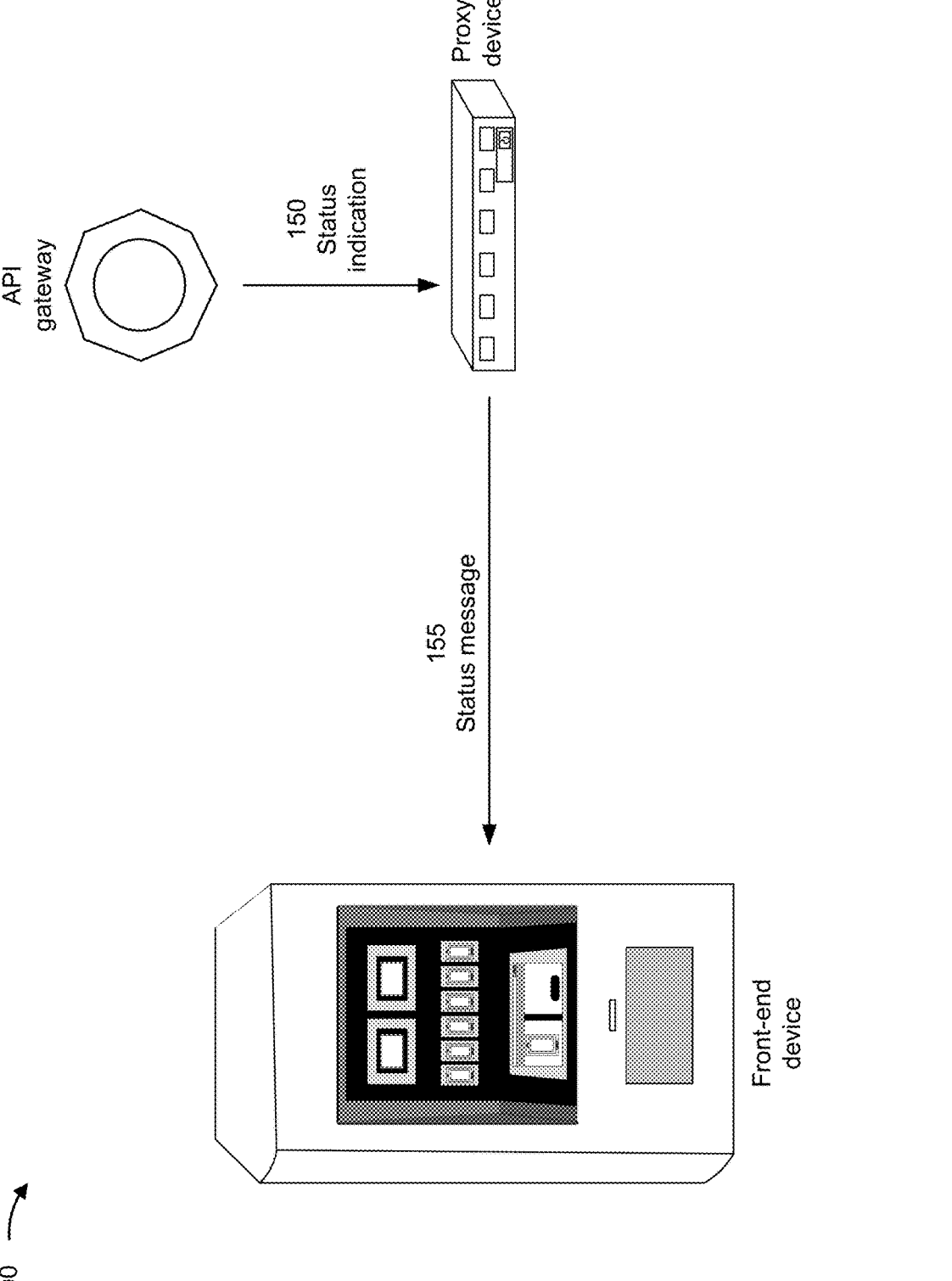

The API gateway may pass the request associated with the action from the proxy device to a backend system, associated with the API gateway, for processing. The backend system may indicate a status of the action to the API gateway in response to the request. As shown in FIG. 1E and by reference number 150, the API gateway may transmit, and the proxy device may receive, an indication of the status of the action. The API gateway may transmit, and the proxy device may receive, the indication in response to the request from the proxy device, as described in connection with reference number 145.

As shown by reference number 155, the proxy device may transmit, and the front-end device may receive, a message indicating the status of the action. For example, the proxy device may forward the indication from the API gateway to the front-end device. Alternatively, the proxy device may extract status information from the indication from the API gateway and generate a message to transmit to the front-end device that includes the extracted status information.

In some implementations, the front-end device may output an indication of the status to the user of the front-end device. The front-end device may use an output component (e.g., a screen or a speaker, among other examples) to inform the user of the status of the action. For example, the front-end device may display an indication of the status and/or may play audio indicating the status. In some implementations, the front-end device may additionally or alternatively proceed with the action based on the indication of the status. For example, the backend system may approve a withdrawal such that the front-end device dispenses money to the user. In another example, the backend system may verify an identity of the user such that the front-end device provides the user permission to an access-controlled entry (e.g., by lifting a gate, unlocking a door, or activating an elevator, among other examples).

Figure 1F:
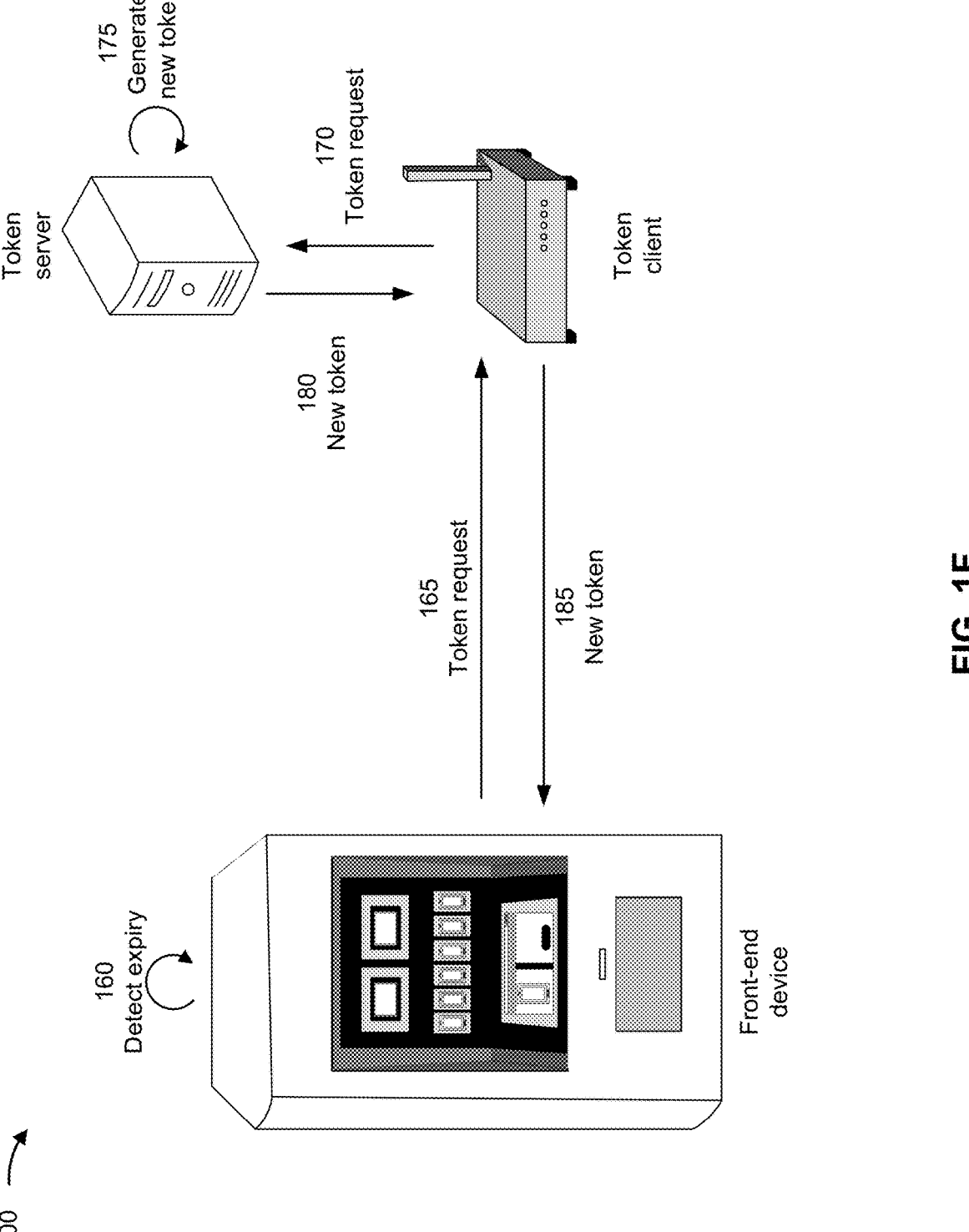

As shown in FIG. 1F and by reference number 160, the front-end device may detect expiry of the token. For example, the front-end device may decode the token (e.g., from a Base64url encoding, as defined in the NWC RFC 3548 from the IETF, or another type of encoding) to determine an expiry time and/or a use-based expiry associated with the token, as described above. Additionally, or alternatively, the front-end device may receive a message indicating that the status of the action is a failure status and detect expiry of the token based on the failure status. For example, the failure status may include a flag (or another type of codepoint) indicating that failure was related to expiry of the token.

Accordingly, as shown by reference number 165, the front-end device may transmit, and the token client may receive, a request for a new token. For example, the front-end device may transmit a request for authorization of the front-end device, and the request for authorization may be associated with token-based authorization. In some implementations, the front-end device may transmit the request based on the expiry of the token (e.g., in response to detecting the expiry of the token).

As shown by reference number 170, the token client may transmit, and the token server may receive, a request for a new token that is associated with the front-end device and that is derived from the secret associated with the front-end device. The token client may transmit the request for the new token based on the request for authorization from the front-end device. For example, the token client may forward the request from the front-end device to the token server. Alternatively, the token client may extract information from the request from the front-end device and generate a request to transmit to the token server that includes the extracted information.

Although the example 100 is described in connection with the front-end device detecting the expiry of the token, other examples may include the token client detecting the expiry of the token. Accordingly, the token client may transmit the request for the new token to the token server in response to detecting the expiry rather than in response to a request from the front-end device. Alternatively, the token client may transmit the request for the new token to the token server prior to the expiry associated with the token. For example, the token client may transmit the request for the new token to the token server according to a schedule. The schedule may be associated with an interval that ends earlier than the expiry associated with the token. For example, the token client may establish the schedule with the interval based on the expiry that the token client determined, as described in connection with FIG. 1C.

As shown by reference number 175, the token server may generate the new token based on the secret. The token server may generate the new token in response to the request from the token client, as described in connection with reference number 170. The new token may be a JWT or another type of web token. The new token may be associated with an expiry time (e.g., an expiration time claim in an exp field) and/or a use-based expiry (e.g., a use threshold), as described above. The token server may use the same secret from the KDC (e.g., received as described in connection with reference number 115 and stored by the token server) to generate the new token. In some implementations, the token server may again request the secret associated with the front-end device from the KDC (e.g., similarly as described in connection with reference number 115) in order to generate the new token.

As shown by reference number 180, the token server may transmit, and the token client may receive, the new token. The token server may transmit, and the token client may receive, the new token in response to the request for the new token from the token client, as described in connection with reference number 170. In some implementations, the token client may determine an expiry associated with the token. For example, the token client may decode the token (e.g., from a Base64url encoding, as defined in the NWC RFC 3548 from the IETF, or another type of encoding) to determine an expiry time and/or a use-based expiry associated with the token, as described above.

As shown by reference number 185, the token client may transmit, and the front-end device may receive, the new token. The token client may transmit, and the front-end device may receive, the new token in response to the request for authorization from the front-end device, as described in connection with reference number 165. In some implementations, the front-end device may store the new token, as described in connection with FIG. 1C. For example, the front-end device may overwrite the token (e.g., the previously stored token) with the new token. Accordingly, the front-end device may use the new token in a request for a new action to the proxy device (e.g., similarly as described in connection with FIGS. 1D and 1E) and/or in a request to re-attempt a failed action.

Replacing the token (either after expiry or periodically before expiry) improves security because, even if an attacker obtains the old token, the attacker cannot use the old token to perform an unauthorized action (e.g., via the proxy device). Moreover, the token may be replaced without the KDC generating a new secret (that is, the new token may be generated using the same secret), which conserves power and processing resources.

By using techniques as described in connection with FIGS. 1A-1F, the front-end device uses the token in requests transmitted to the proxy device. As a result, the front-end device conserves power and processing costs that would otherwise have been incurred in digitally signing the requests with the secret. Additionally, the token client uses less network overhead to transmit the token to the front-end device as compared with transmitting the secret.

As indicated above, FIGS. 1A-1F are provided as an example. Other examples may differ from what is described with regard to FIGS. 1A-1F.

Figure 2:
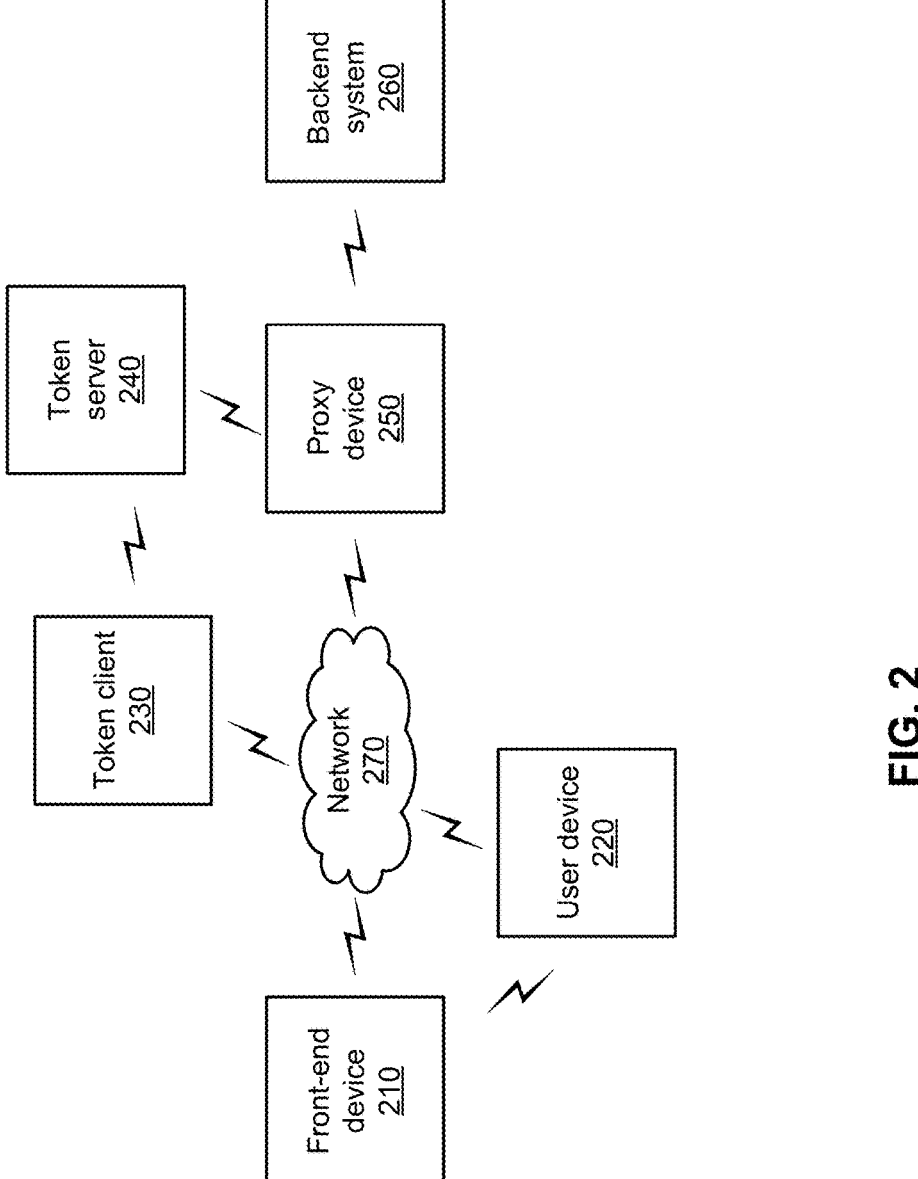
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a front-end device 210, a user device 220, a token client 230, a token server 240, a proxy device 250, a backend system 260, and/or a network 270. Devices of environment 200 may interconnect via wired connections and/or wireless connections.

The front-end device 210 may include one or more devices capable of facilitating an electronic transaction. For example, the front-end 210 may include a PoS terminal, a payment terminal (e.g., a credit card terminal, a contactless payment terminal, a mobile credit card reader, or a chip reader), and/or an ATM. In some implementations, the front-end device 210 may include an access control terminal (e.g., used to control physical access to a secure area), such as an access control panel used to control an access-controlled entry (e.g., a turnstile, a door, a gate, or another physical barrier). The front-end device 210 may include one or more input components and/or one or more output components to facilitate obtaining data (e.g., account information) from the user device 220 and/or to facilitate interaction with and/or authorization from an owner or accountholder of the user device 220. Example input components of the front-end device 210 include a number keypad, a touchscreen, a magnetic stripe reader, a chip reader, and/or a radio frequency (RF) signal reader (e.g., a near-field communication (NFC) reader). Example output devices of front-end device 210 include a display and/or a speaker.

The user device 220 may include one or more devices capable of being used for an electronic transaction. In some implementations, the user device 220 may include a transaction card (or another physical medium with integrated circuitry) capable of storing and communicating account information, such as a credit card, a debit card, a gift card, an ATM card, a transit card, a fare card, and/or an access card. In some implementations, the user device 220 may be a mobile device or may be integrated into a mobile device. For example, the mobile device may execute an electronic payment application capable of performing functions of the user device 220 described herein. Thus, one or more operations described herein as being performed by the user device 220 may be performed by a transaction card, a mobile device, or a combination thereof. The mobile device may include a communication device and/or a computing device. For example, the mobile device may include a wireless communication device, a mobile phone, a user equipment, a tablet computer, a wearable communication device (e.g., a smart wristwatch, a pair of smart eyeglasses, a head mounted display, or a virtual reality headset), or a similar type of device.

The user device 220 may store account information associated with the user device 220, which may be used in connection with an electronic transaction facilitated by the front-end device 210. The account information may include, for example, an account identifier that identifies an account (e.g., a bank account or a credit account) associated with the user device 220 (e.g., an account number, a card number, a bank routing number, and/or a bank identifier), a cardholder identifier (e.g., identifying a name of a person, business, or entity associated with the account or the user device 220), expiration information (e.g., identifying an expiration month and/or an expiration year associated with the user device 220), and/or a credential (e.g., a payment token). In some implementations, the user device 220 may store the account information in tamper-resistant memory of the user device 220, such as in a secure element. As part of performing an electronic transaction, the user device 220 may transmit the account information to the front-end device 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the user device 220 and the front-end device 210 may communicate with one another by coming into contact with one another (e.g., using a magnetic stripe or an EMV chip) or via contactless communication (e.g., using NFC).

The token client 230 may include one or more devices capable of receiving, generating, storing, processing, providing, and/or routing information associated with tokens, as described elsewhere herein. The token client 230 may include a communication device and/or a computing device. For example, the token client 230 may include a server, such as an application server, a client server, a web server, a database server, a host server, a proxy server, a virtual server (e.g., executing on computing hardware), or a server in a cloud computing system. In some implementations, the token client 230 may include computing hardware used in a cloud computing environment.

The token server 240 may include one or more devices capable of receiving, generating, storing, processing, providing, and/or routing information associated with tokens, as described elsewhere herein. The token server 240 may include a communication device and/or a computing device. For example, the token server 240 may include a server, such as an application server, a client server, a web server, a database server, a host server, a proxy server, a virtual server (e.g., executing on computing hardware), or a server in a cloud computing system. In some implementations, the token server 240 may include computing hardware used in a cloud computing environment. In some implementations, the token client 230 may communicate with a KDC via the token server 240.

The proxy device 250 may include one or more devices capable of receiving, processing, storing, routing, and/or providing traffic (e.g., a packet and/or other information or metadata) in a manner described herein. For example, the proxy device 250 may include a router, such as a label switching router (LSR), a label edge router (LER), an ingress router, an egress router, a provider router (e.g., a provider edge router or a provider core router), a virtual router, or another type of router. Additionally, or alternatively, the proxy device 250 may include a gateway, a switch, a firewall, a hub, a bridge, a reverse proxy, a server (e.g., a proxy server, a cloud server, or a data center server), a load balancer, and/or a similar device. In some implementations, the proxy device 250 may be a physical device implemented within a housing, such as a chassis. In some implementations, the proxy device 250 may be a virtual device implemented by one or more computing devices of a cloud computing environment or a data center. In some implementations, a group of proxy devices 250 may be a group of data center nodes that are used to route traffic flow through a network.

The backend system 260 may include one or more devices capable of processing, authorizing, and/or facilitating a transaction. For example, the backend system 260 may include one or more servers and/or computing hardware (e.g., in a cloud computing environment or separate from a cloud computing environment) configured to receive and/or store information associated with processing an electronic transaction. The backend system 260 may process a transaction, such as to approve (e.g., permit, authorize, or the like) or decline (e.g., reject, deny, or the like) the transaction and/or to complete the transaction if the transaction is approved. The backend system 260 may process the transaction based on information received from the front-end device 210, such as transaction data (e.g., information that identifies a transaction amount, a merchant, a time of a transaction, a location of the transaction, or the like), account information communicated to the front-end device 210 by the user device 220, and/or information stored by the backend system 260 (e.g., for fraud detection). In some implementations, the backend system 260 may communicate with the front-end device 210 via an API gateway that is provisioned for the proxy device 250.

The backend system 260 may be associated with a financial institution (e.g., a bank, a lender, a credit card company, or a credit union) and/or may be associated with a transaction card association that authorizes a transaction and/or facilitates a transfer of funds. For example, the backend system 260 may be associated with an issuing bank associated with the user device 220, an acquiring bank (or merchant bank) associated with the merchant and/or the front-end device 210, and/or a transaction card association (e.g., VISA® or MASTERCARD®) associated with the user device 220. Based on receiving information associated with the user device 220 from the front-end device 210, one or more devices of the backend system 260 may communicate to authorize a transaction and/or to transfer funds from an account associated with the user device 220 to an account of an entity (e.g., a merchant) associated with the front-end device 210.

The network 270 may include one or more wired and/or wireless networks. For example, the network 270 may include a cellular network, a public land mobile network, a local area network, a wide area network, a metropolitan area network, a telephone network, a private network, the Internet, and/or a combination of these or other types of networks. The network 270 enables communication among the devices of environment 200. In some implementations, the front-end device 210 may communicate with the user device 220 using a first network (e.g., a contactless network or by coming into contact with the user device 220) and may communicate with the backend system 260 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
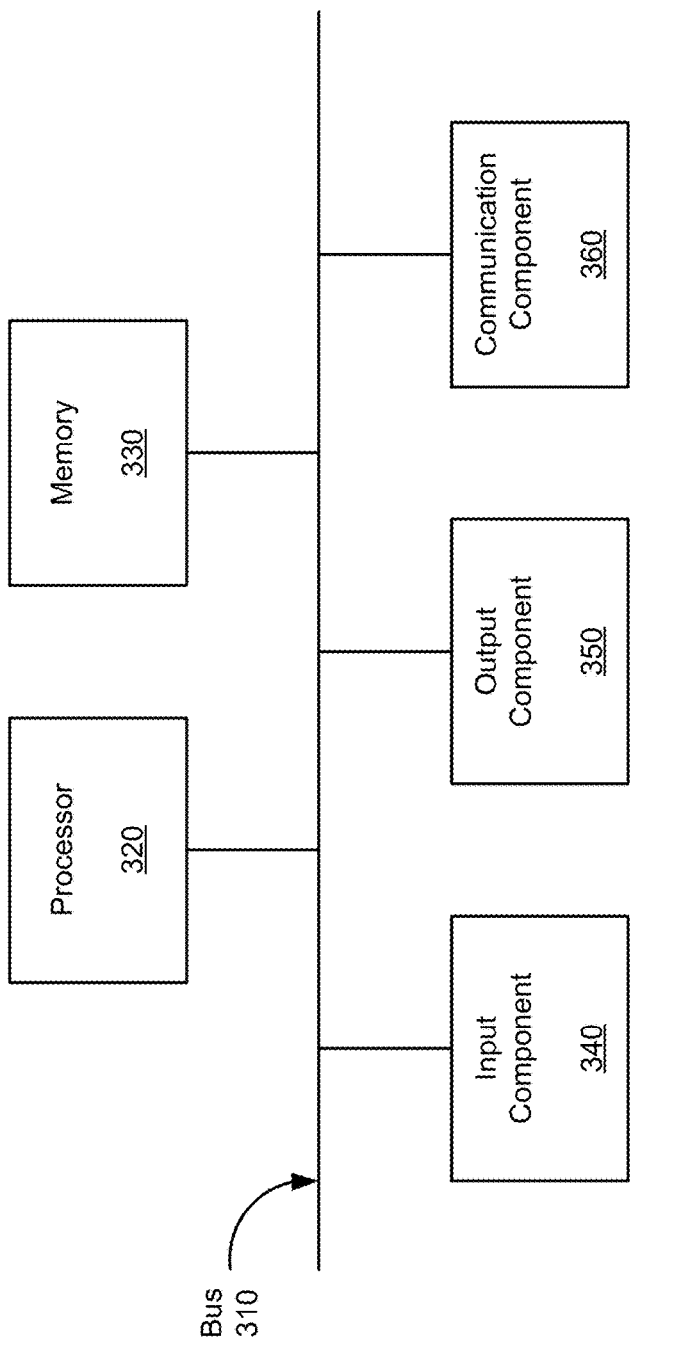
FIG. 3 is a diagram of example components of one or more devices of FIG. 2, in accordance with some embodiments of the present disclosure.

FIG. 3 is a diagram of example components of a device 300 associated with authorizing front-end devices with tokens. The device 300 may correspond to the front-end device 210, the user device 220, the token client 230, the token server 240, the proxy device 250, and/or the backend system 260. In some implementations, the front-end device 210, the user device 220, the token client 230, the token server 240, the proxy device 250, and/or the backend system 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with authorizing front-end devices with tokens. In some implementations, one or more process blocks of FIG. 4 may be performed by the front-end device 210. In some implementations, one or more process blocks of FIG. 4 may be performed by another device or a group of devices separate from or including the front-end device 210, such as the user device 220, the token client 230, the token server 240, the proxy device 250, and/or the backend system 260. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a token client, a token associated with the front-end device and derived from a secret associated with the front-end device (block 410). For example, the front-end device 210 (e.g., using processor 320, memory 330, input component 340, and/or communication component 360) may receive, from a token client, a token associated with the front-end device and derived from a secret associated with the front-end device, as described above in connection with reference number 130 of FIG. 1C. As an example, the token client may transmit, and the front-end device may receive, the token in response to a request for authorization from the front-end device.

As further shown in FIG. 4, process 400 may include storing the token (block 420). For example, the front-end device 210 (e.g., using processor 320 and/or memory 330) may store the token, as described above in connection with reference number 130 of FIG. 1C. As an example, the front-end device may store the token in a storage that is integrated with the front-end device (e.g., a local memory, such as a registry, associated with the front-end device). Alternatively, the front-end device may store the token in a storage that is at least partially separate (e.g., physically, logically, and/or virtually) from the front-end device. Accordingly, the front-end device may transmit a request to store the token (along with the token) to the storage, and the storage may transmit a confirmation message to the front-end device in response to storing the token.

As further shown in FIG. 4, process 400 may include receiving, from an input component associated with the front-end device, a request to perform an action (block 430). For example, the front-end device 210 (e.g., using processor 320, memory 330, input component 340, and/or communication component 360) may receive, from an input component associated with the front-end device, a request to perform an action, as described above in connection with reference number 135 of FIG. 1D. As an example, the front-end device may receive input from a user (e.g., using the input component) that comprises the request.

As further shown in FIG. 4, process 400 may include transmitting, to a proxy device, a request associated with the action and including the token (block 440). For example, the front-end device 210 (e.g., using processor 320, memory 330, and/or communication component 360) may transmit, to a proxy device, a request associated with the action and including the token, as described above in connection with reference number 135 of FIG. 1D. As an example, the front-end device may address the request to an IP address, a MAC address, and/or another type of identifier associated with the proxy device. In some implementations, the request may include an HTTP request, an FTP request, or another type of web request. Additionally, or alternatively, the front-end device may perform a call to an API associated with the proxy device such that the call to the API comprises the request.

As further shown in FIG. 4, process 400 may include receiving, from the proxy device, a message indicating a status of the action based on an authorization attempt using the token (block 450). For example, the front-end device 210 (e.g., using processor 320, memory 330, input component 340, and/or communication component 360) may receive, from the proxy device, a message indicating a status of the action based on an authorization attempt using the token, as described above in connection with reference number 155 of FIG. 1E. As an example, the proxy device may forward an indication of the status from an API gateway to the front-end device. Alternatively, the proxy device may extract status information from a message received from an API gateway and generate the message to transmit to the front-end device that includes the extracted status information.

As further shown in FIG. 4, process 400 may include outputting, using an output component associated with the front-end device, an indication of the status (block 460). For example, the front-end device 210 (e.g., using processor 320, memory 330, and/or output component 350) may output, using an output component associated with the front-end device, an indication of the status, as described above in connection with reference number 155 of FIG. 1E. As an example, the front-end device may display an indication of the status and/or may play audio indicating the status.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of authorizing a front-end device, comprising:

receiving, from a token client, a web token associated with the front-end device and derived from information associated with the front-end device;

verifying the web token by decrypting the web token using a cryptographic key corresponding to the front-end device;

authenticating the front-end device based on the verified web token;

storing the web token in a registry corresponding to the front-end device, wherein the registry is configured to periodically update the web token based on a predefined schedule and detect token expiry;

transmitting, to a proxy device, a request corresponding to an action based at least in part on the stored web token; and outputting, via an output component corresponding to the front-end device, status information indicating a status of the action, the status information corresponding to a status message received from the proxy device.

2. The method of claim 1, wherein storing the web token comprises:

storing the web token in a registry corresponding to the front-end device.

3. The method of claim 1, wherein receiving the web token comprises:

transmitting, to a token client, a request for authorization; and receiving, from the token client, the web token in response to the request for authorization.

4. The method of claim 1, wherein the web token is a first token, and wherein the method further comprises:

receiving, from a token client, a second token associated with the front-end device, the second token including a signature derived from the information using a cryptographic algorithm; and overwriting the first token with the second token.

5. The method of claim 1, wherein the request includes the web token in a header of the request.

6. The method of claim 1, further comprising:
detecting expiry of the web token; and
transmitting, to a token client, a request for authorization based on the expiry of the web token.

7. The method of claim 1, wherein the status message indicates the status of the action based at least in part on an authorization attempt using the web token.

8. The method of claim 1, wherein the web token indicates an expiry time or use threshold, and
wherein the method further comprises:
decoding the web token to identify the expiry time or a use-based expiry corresponding to the web token.

9. A system for authorizing a front-end device, the system comprising:
one or more memories; and
one or more processors, coupled to the one or more memories, configured to:
receive, from the front-end device, a request to perform an action, wherein the request includes a web token associated with the front-end device;
verify the web token by decrypting the web token using a cryptographic key corresponding to the front-end device;
authenticate the front-end device based on the verified web token;
store the web token in a registry associated with the front-end device, wherein the registry is configured to periodically update the web token based on a predefined schedule and detect token expiry:
transmit, to a token server, a request for a new token prior to an expiry corresponding to the web token;
receive, from the token server, the new token in response to the request for the new token; and
transmit, to the front-end device, the new token.

10. The system of claim 9, wherein the one or more processors are further configured to:
receive, from the front-end device, a request for authorization, wherein the request for the web token is transmitted based on the request for authorization.

11. The system of claim 9, wherein the one or more processors, to transmit the request for the new token, are configured to:
transmit the request for the new token according to a schedule, wherein the schedule is associated with an interval that ends earlier than the expiry associated with the web token.

12. The system of claim 9, wherein the request for the web token includes an identifier associated with the front-end device.

13. The system of claim 12, wherein the one or more processors are further configured to:
receive, from the front-end device, the identifier associated with the front-end device.

14. The system of claim 9, wherein the web token comprises a JavaScript object notation web token.

15. A non-transitory computer-readable medium storing a set of instructions for authorizing an automated teller machine, the set of instructions comprising:
one or more instructions that, when executed by one or more processors of a device, cause the device to:
receive, from the automated teller machine, a request to perform an action, wherein the request includes a web token corresponding to the automated teller machine;
verify the web token by decrypting the web token using a cryptographic key corresponding to the automated teller machine;
authenticate the automated teller machine based on the verified web token; and
update a token status in a registry maintained by the device.

16. The non-transitory computer-readable medium of claim 15, wherein the one or more instructions, when executed by the one or more processors, further cause the device to:
extract the web token from a header of the request to perform the action.

17. The non-transitory computer-readable medium of claim 15, wherein the one or more instructions, that cause the device to verify the web token, cause the device to:
perform an application programming interface (API) call, including the web token as an argument, to an authentication function; and
verify the web token based on a response from the authentication function.

18. The non-transitory computer-readable medium of claim 15, wherein the one or more instructions, when executed by the one or more processors, further cause the device to:
receive, via a network, an additional request, including the web token;
determine that the web token is expired; and
transmit, via the network, a failure message based on expiry of the web token.

19. The non-transitory computer-readable medium of claim 18, wherein the one or more instructions, that cause the device to determine that the web token is expired, cause the device to:
perform an application programming interface (API) call, including the web token as an argument, to an authentication function; and
determine that the web token is expired based on a response from the authentication function.

20. The non-transitory computer-readable medium of claim 15, wherein the web token comprises a JavaScript object notation web token.

\* \* \* \* \*